United States Patent Office 3,574,114
Patented Apr. 6, 1971

3,574,114
FINE GRAIN CERAMIC FERRITES
Frank R. Monforte, Passaic Township, Morris County, N.J., assignor to Bell Telephone Laboratories, Incorporated, Murray Hill, N.J.
No Drawing. Filed Aug. 5, 1968, Ser. No. 750,027
Int. Cl. C04b 35/26
U.S. Cl. 252—62.6
6 Claims

ABSTRACT OF THE DISCLOSURE

The incorporation of critical amounts of magnesium sulfate as a starting ingredient results in controlled uniform fine grain size in a variety of ceramic materials produced by otherwise conventional calcining and firing. Concerned compositions included magnetic ferrites of a type not ordinarily containing magnesium.

BACKGROUND OF THE INVENTION

(1) Field of the invention

The invention is concerned with ceramic materials of controlled uniform fine grain size. Exemplary materials are the ceramic magnetic ferrites. Classes of ferrites include those designed for inductor use or microwave use and also those of interest by reason of their square loop properties.

(2) Description of the prior art

Fine grain size has been of long standing interest to those in the ceramics arts. It has been of particular concern in connection with magnetic ferrites where grain size has been recognized as having a direct effect on magnetic properties.

In square loop ferrites, fine and also uniform grain is desired to produce uniform coercivity and, therefore, predictable magnetic properties. It has become increasingly important as memory cores and other square loop configurations have been miniaturized.

It has been assumed for some years that losses are generally inversely proportional to grain size. In fact, fine grain size has been considered desirable in a very broad class of ceramic materials for a variety of reasons. In inductor ferrites used, for example, in recorder heads, it is found that fine grain results in better abrasion resistance.

Despite the acknowledged advantage of finer grain size, no consistent techniques resulting in finer grain in materials produced by usual ceramic techniques have been developed. Instead, empirical processing conditions dependent on composition configuration and other considerations have evolved. Reproducibility has not been adequate and, for particularly critical uses, it has often been necessary to reject large batches of material.

Recently, a cryochemical technique adaptable to the manufacture of fired ceramics was announced. See my article from the Proceedings of the Fourth International Conference of Science of Ceramics, Apr. 23–27, 1967, in Maastricht, Netherlands, to be published in Science of Ceramics, vol. 4.

In accordance with this technique, a liquid solution of compounds of such nature as to be decomposable to the desired oxidic ingredients is injected into a fluid refrigerant in the form of small globules produced, for example, by passage through an atomizing nozzle. The globules, quick frozen under such conditions as to avoid substantial coalescence are then collected, vacuum dried, and thermally converted. Resulting bodies may then easily be crushed and fired to produce fine grain ceramics such as spinel ferrites. The procedure is reliable and does result in the preparation of reproducible uniform fine grain material. For many purposes, however, it continues to be expedient to prepare ferrites by conventional calcining and firing. No commercial procedure is available for the general preparation of ferrite materials having a grain size appreciably below 40 microns.

BRIEF DESCRIPTION OF THE INVENTION

It has been found that fine grain size consistently results from the incorporation of a critical amount of magnesium sulfate as an initial ingredient prior to firing in the preparation of any of the class of magnetic ferrite ceramic compositions. It is a general requirement of the inventive process that a critical amount of magnesium sulfate be present during firing. While this ingredient may be introduced at an earlier stage, a preferred procedure is based on its introduction subsequent to calcining. Use of these processes results in reproducible uniform grain size of less than 40 microns with other process conditions within the ranges conventionally practiced. Grain size of less than 20 microns may be regularly attained.

DETAILED DESCRIPTION

(1) Concerned compositions

The inventive process is applicable to the entire class of domain magnetic ceramic ferrite compositions. While most concerned ferrites are spinels and are ferrimagnetic, the class of materials beneficially processed in accordance with the invention include non-spinels and also ferromagnetic and antiferromagnetic compositions. Concerned spinels include the square loop materials, the most popular members of which are members of the magnesium manganese ferrite system and also compositions used in microwave applications and as inductors. Some of these materials may include additional ingredients such as cadmium, copper, nickel, zinc, calcium, cobalt and chromium.

It is convenient to consider the normal ferrite composition in terms of its molar content of oxidic materials. A representative magnesium manganese ferrite, therefore, has the composition:

|  | Mole percent |
| --- | --- |
| Magnesium oxide | 32.1 |
| Manganese oxide | 25 |
| Ferric oxide | 42.9 |

This basic system is described by Albers-Schoenberg U.S. Pat. 2,715,109.

Other square loop compositions (sometimes defined as having Br:Br ratio of at least 0.7) may include additional oxide constituents generally included for the purpose of adjusting coercive force and squareness ratios to values desired for particular use. Commonly used materials include up to 55 mol percent magnesium oxide (U.S. Pat. 2,981,689), up to 15 mol percent cadmium oxide (U.S. Pat. 2,950,251), up to 30 mol percent copper oxide (U.S. Pat. 2,818,387), up to 9 mol percent nickel oxide (U.S. Pat. 2,987,481), up to 18 mol percent zinc oxide (U.S. Pat. 3,226,327), up to 6 mol percent calcium oxide (U.S. Pat. 2,981,689), up to 1.3 mol percent cobalt oxide (U.S. Pat. 2,882,236), and up to 10 mol per cent chromium oxide (U.S. Pat. 2,950,252), remainder up to 60 mol percent iron oxide.

Other additions may be made for still other purposes, for example, palladium, platinum or thoria may be added to impede domain wall motion.

Another significant class of spinel ferrite materials finds use in inductor and transformer cores. Typical materials may contain from 10 to 35 mol percent nickel oxide, for 10 to 30 mol percent zinc oxide, up to 2 mol percent cobalt oxide. Such materials form the magnetic class of ferrites typically not containing magnesium. It is a significant finding in accordance with this invention that grain size in these compositions also may be reduced by incorporation of magnesium sulfate. Required amounts of this additional ingredient improve grain structure and are not generally such as to result in significant changes in magnetic properties traceable to factors other than grain size.

(2) Processing

A conventional processing cycle is described after which the modifications introduced by the invention are set forth.

(a) Conventional processing: Initial ferrite ingredients are either oxides or other compounds which will thermally decompose to yield oxides during processing. It is convenient to discuss ferrite compositions in terms of the oxides which are either initially introduced or which eventually result.

Starting materials are ordinarily mixed in a paste mixer. This mixing step may be carried out in a water slurry or in a non-aqueous solution such as acetone, carbon tetrachloride, or ethanol.

The mixture is dried by filtering if a water slurry is used or otherwise by evaporation.

The dried mixture is calcined generally at a temperature of from 200° C. to 400° C. below the final firing temperature. A range applicable to many ferrites is from 700° C. to 1200° C.

The calcined mixture is ball milled, for example, in any of the media used in initial mixing. Typical ball milling periods are from several hours to a day or more. Sometime during milling, a binder (usually some form of wax) is added. This binder is either dissolved by the ball milling medium or is added in the form of a solution. In either event it acts as a lubricant during pressing.

The medium is removed by heating while stirring the ball milled mixture.

The waxy mixture is passed through a screen to obtain uniform granules.

The granules are put in a vacuum oven to remove the last traces of the medium and/or binder solvent.

The mixture is pressed to produce the desired "green" or unfired form.

The pressed pieces are dewaxed by heating.

Dewaxed, pressed forms are final-fired, generally in an oxidizing atmosphere at temperatures typically in excess of 1200° C. The temperature schedule followed during final firing may affect ferrite properties of interest such as density, resonance line width, etc.

(b) Processing modification: It is a general requirement of the inventive process that magnesium sulfate be present at the commencement of final firing. It is possible to introduce the magnesium sulfate at an earlier stage of processsing and even as an initial ingredient prior to calcining providing calcining is carried out under such conditions as to result in sufficient residual sulfate at the commencement of final firing. A general requirement is that such calcining be carried out at a temperature no higher than 1000° C. For temperatures above 1000° C., usual calcining times result in substantially complete decomposition of the sulfate.

Where the sulfate is present during calcining, there is a further requirement that calcining temperature be no lower than 750° C. Below 750° C. shrinkage results in a tight structure which traps gasses. Such gasses evolve during subsequent sulfate decomposition and can cause rupture in the final-fired body.

If the sulfate is introduced as an initial ingredient prior to calcining, the entire conventional procedure, however, with the exceptions noted, may be followed.

The preferred time for magnesium sulfate addition is, however, subsequent to calcining. In accordance with this preferred approach, the raw materials, except for the magnesium sulfate, are mixed, filtered, dried, granulated, and calcined as outlined, for example, under "Conventional processing."

The magnesium sulfate is then added to the calcined material after which the conventional procedure subsequent to calcining is followed. To assure optimum distribution, it is appropriate to introduce the magnesium sulfate as a water solution and to then evaporate the mixture to dryness while stirring to prevent separation. Any mixing procedure assuring adequate dispersion may be substituted.

Since the magnesium sulfate addition may or may not alter the magnesium content of the body to be fired, it is convenient to consider such addition in terms of the equivalent amount of elemental sulfur which is not ordinarily otherwise introduced. In the following discussion, reference is made to "weight percent sulfur." This quantity is the amount of equivalent elemental sulfur expressed as a percentage of total oxidic ingredients (including magnesium added as sulfate) together with sulfur.

While extremely small amounts of magnesium sulfate result in discernible reduction in grain size, significant results are obtained only by use of an amount of at least 0.25 weight percent based on the entire oxidic composition and sulfur. A preferred minimum is about 1 weight percent on the same basis, since use of this amount assures a reduction in grain size approaching two-fold for firing to a given density. The maximum sulfur inclusion is about 10 weight percent on the same basis. Amounts substantially in excess result in extended firing times. A preferred maximum for many purposes is at the 5 weight percent level.

The magnesium sulfate ranges indicated above are those which dictate the amount of that material present when final firing is initiated. The range may be exceeded where the sulfur is initially introduced since some decomposition results during calcining. From the standpoint of grain size, the ranges set forth are applicable to all ferrite compositions within the scope of this description regardless of whether the nominal prior art composition contains magnesium, and independent of the amount desired to produce the magnetic properties of the composition. Accordingly, in certain compositions, magnesium may be added twice, part before calcining and part after, and may be introduced in the form of two different componds, for example, magnesium carbonate initially and, of course, magnesium sulfate after calcining. In inductor ferrites in which magnesium does not bring about modification of magnetic properties in any desired manner, it may be preferable to use a relatively small amount of magnesium sulfate. A preferred maximum inclusion of magnesium sulfate in compositions not ordinarily containing magnesium may be at 2.5 percent on the same basis from the standpoint of other characteristics.

Many device requirements impose a restriction on the final fired density of the ceramic product. While any given density obtainable without sulfate inclusion may also be attained with sulfate inclusion, the required firing time is generally increased. This may introduce a further consideration on the selected amount of sulfate inclusion. It has been generally observed that for given conditions required firing time is increased of the order of 20 percent for each additional weight per cent of sulfate.

EXAMPLES

Examples 1 through 5

Five samples of magnesium manganese ferrite were prepared by standard ceramic processing. All five samples had the same final composition, namely, 42.86 $Fe_2O_3$, 25.0 MnO, 32.14 MgO, all in molar percent. The samples differ from each other with respect to the relative amount of magnesium added as sulfate. The general procedure followed in formation of the five compositions is set forth. In each instance 100 grams of end product resulted. Starting amounts are expressed in terms of grams of oxidic ingredients even though actual starting ingredients were not necessarily oxides. Iron was, in fact, added as ferrite oxide $Fe_2O_3$. Manganese was added as $MnCO_3$, and magnesium was added as carbonate $MgCO_3$ for the portion introduced prior to calcining and, of course, as sulfate $MgSO_4$ for the amount introduced subsequent to calcining. The forming procedure followed was that generally described above under "Conventional processing" as modified by the steps recited under "Modification processing." All samples were fired to an ultimate density of 96 percent. This figure is the percentage of theoretical or single crystal density. The pertinent results are set forth in tabular form:

| Example No.: | Weight percent sulfur | $MgSO_4$, grams | Grain size, microns | Firing Time, hours [1] |
|---|---|---|---|---|
| 1 | 1 | 3.75 | 24 | 12 |
| 2 | 2 | 7.50 | 15 | 14 |
| 3 | 3 | 11.25 | 13 | 16 |
| 4 | 4 | 15.00 | 11 | 18 |
| 5 | 5 | 18.75 | 9 | 20 |

[1] Required to attain 96% density.

All of the specimens of Examples 1 through 5 were in the form of discs and all evidenced $Br:Bs$ ratios in excess of .93. For comparison purposes a standard was run in which all magnesium was initially introduced as MgO (13.07 grams). This standard had a grain size of the order of 40 microns. Gross loop characteristics were approximately the same as for the samples prepared in accordance with the invention.

Examples 6 through 9

In accordance with these examples a common inductor ferrite composition, manganese zinc ferrite, was modified by the introduction of varying amounts of $MgSO_4$ in water solution. Introduction was subsequent to calcining in accordance with "Modified processing." Other processing conditions were identical for all samples as well as for the standard composition containing no $MgSO_4$ and were in the ranges set forth under "Conventional processing." Since magnesium is not ordinarily included in compositions of this nature, the additions of sulfate resulted in modifications of the final materials. The composition which was modified by such additions was in each instance $Fe_2O_3$ ---------------------------------------- 51.0
ZnO ---------------------------------------- 23.4
MnO ---------------------------------------- 25.6 all in mol percent. While 100 grams of standard composition was produced, the amount of modified material was in such larger quantities as resulted from the addition of the indicated amount of magnesium. For convenience the table includes each final composition in terms of mol percent based on the total composition including MgO.

| Example No.: | Weight percent sulfur | $MgSO_4$, grams | Grain size, microns | Firing Time, hours [1] |
|---|---|---|---|---|
| 6 | .5 | 1.875 | 20 | 2 |
| 7 | 1 | 3.75 | 8 | 3 |
| 8 | 2 | 7.50 | 6 | 16 |
| 9 | 3 | 11.25 | 5 | 24 |

[1] Required to attain 95% density.

By comparison the standard inductor ferrite prepared without $MgSO_4$ shows a grain size of greater than 50 microns. Time required to reach 95 percent density was two hours (not noticeably different from the time required for the modified composition of Example 6). Magnetic properties of interest for inductor use were not noticeably altered. Permeabilities of 1000 or more and magnetic quality $(Q) > 100$ at a measuring frequency of 100 kHz. for all samples.

Examples 10, 11

A nickel zinc cobalt ferrite was modified by the addition of magnesium sulfate in accordance with "Modified procedure." As in Examples 6 through 9, starting amounts of the standard composition were such as to result in 100 grams of final material. The final amount of each modified sample was increased by the equivalent MgO addition.

| Ex. No. | Wt. percent | | Mol percent | | | | Grain size, microns | Time, hours [1] |
|---|---|---|---|---|---|---|---|---|
| | Sulfur | $MgSO_4$ | $Fe_2O_3$ | ZnO | CoO | NiO | | |
| 10 | 1 | 3.75 | 48.54 | 20.51 | 0.69 | 30.26 | 30 | 2 |
| 11 | 3 | 11.25 | 48.54 | 20.51 | 0.69 | 30.26 | 8 | 6 |

[1] Required to attain 95% density.

Grain size for the unmodified, that is for the standard composition, was of the order of 40 microns. Again, permeability and Q (magnetic loss factor) values were at about the same level for all samples including the standard. Permeability was about 50 and Q was greater than 100 at 5 mHz.

The general requirement for compositions to which $MgSO_4$ is beneficially added in accordance with these teachings is that final firing be carried out at a temperature of at least 1125° C. for a period of at least 4 hours. Substantially lower temperature is insufficient to decompose the sulfate. Shorter times suffice at higher temperatures so that a minimum firing time of 30 minutes is sufficient for a firing temperature of 1500° C. Commercial materials most sensitive to grain size and amenable to the inventive processing are the spinel ferrimagnetic ferrites. That is, those which may be considered as substituted magnetite, $Fe^{2+}Fe^{3+}O_4$. Grain size may, however, be reduced in other compositions in which the necessary firing conditions are attained. Examples are garnet ceramics such as $Y_3Fe_5O_{12}$ (YIG) and variations based on partial and complete substitutions as well as orthoferrites $REFeO_3$ in which RE is one or more of the 4F rare elements or yttrium and variants thereof.

With regard to processing, certain variations are also permissible, the only requirement being that $MgSO_4$ be present at the initiation of firing within the recited range. It has been indicated that excellent dispersion is achieved by use of a water solution of $MgSO_4$. This water solution may be applied in a variety of ways or it may be replaced by a granular ingredient which may be admixed mechanically.

The invention has been described in terms of a limited number of examples. For example, compositions explicitly discussed are illustrative of classes of particular interest at this time. As noted, examples include compositions ordinarily containing magnesium (generally square loop or memory ferrites) and those not generally containing magnesium (examples represent ferrites of greatest interest for use in inductors). In fact, inclusion of magnesium sulfate in such manner as to leave a residuum within the range recited at the commencement of final firing results in decreasing grain size and it is upon this final firing of a composition including $MgSO_4$ that the invention is premised.

What is claimed is:

1. Process for forming a fired spinel ferrimagnetic ferrite product which consists essentially of 25 to 60 mol. percent ferrite oxide, 4 to 67 mol. percent manganese oxide, up to 55 mol. percent magnesium oxide, up to 15 mol. percent cadmium oxide, up to 30 mol. percent copper oxide, up to 9 mol. percent nickel oxide, up to 18 mol. percent zinc oxide, up to 6 mol. percent calcium oxide, up to 1.3 mol. percent cobalt oxide, up to 10 mol. percent chromium oxide comprising the steps of mixing initial ingredients of such nature as will yield oxides during processing, calcining the said mixture (so as to produce partial reaction) and final firing at a temperature of at least 1125° C., characterized in that $MgSO_4$ is added under such conditions that it is present at the commencement of final firing in an amount of at least 0.25 weight percent expressed in terms of equivalent elemental sulfur as a percentage of a total composition made up of all oxidic final ingredients plus such elemental sulfur.

2. Process of claim 1 in which $MgSO_4$ is added subsequent to calcining.

3. Process of claim 2 in which $MgSO_4$ is added in water solution.

4. Process for forming a fired spinel ferrimagnetic ferrite product which consists essentially of 45 to 65 mol. percent iron oxide, 10 to 35 mol. percent nickel oxide, 10 to 30 mol. percent zinc oxide, up to 2 mol. percent cobalt oxide and the balance manganese oxide comprising the steps of mixing initial ingredients of such nature as will yield oxides during processing, calcining the said mixture (so as to produce partial reaction) and final firing at a temperature of at least 1125° C., characterized in that $MgSO_4$ is added under such conditions that it is present at the commencement of final firing in an amount of at least 0.25 weight percent expressed in terms of equivalent elemental sulfur as a percentage of a total composition made up of all oxidic final ingredients plus such elemental sulfur.

5. Process of claim 4 in which $MgSO_4$ is added subsequent to calcining.

6. Process of claim 5 in which $MgSO_4$ is added in water solution.

References Cited

UNITED STATES PATENTS

| | | | |
|---|---|---|---|
| 3,115,469 | 12/1963 | Hamilton | 252—62.64 |
| 3,296,002 | 1/1967 | Hare | 106—39 |

TOBIAS E. LEVOW, Primary Examiner

R. D. EDMONDS, Assistant Examiner

U.S. Cl. X.R.

252—62.56, 62.62, 62.63, 62.64